US012801763B2

(12) United States Patent
Shang et al.

(10) Patent No.: US 12,801,763 B2
(45) Date of Patent: Nov. 17, 2026

(54) DATA PROTECTION METHOD AND VEHICLE

(71) Applicant: Yinwang Intelligent Technologies Co., Ltd., Shenzhen (CN)

(72) Inventors: Yu Shang, Shanghai (CN); Jiangqi Li, Shenzhen (CN); Zhaohua He, Shenzhen (CN); Shijing Jin, Shenzhen (CN); Feng Geng, Suzhou (CN); Jianlong Cao, Shanghai (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 140 days.

(21) Appl. No.: 18/524,591

(22) Filed: Nov. 30, 2023

(65) Prior Publication Data

US 2024/0095382 A1 Mar. 21, 2024

Related U.S. Application Data

(63) Continuation of application No. PCT/CN2021/098427, filed on Jun. 4, 2021.

(51) Int. Cl.
*G06F 21/60* (2013.01)
*G06F 21/31* (2013.01)
*G06F 21/62* (2013.01)

(52) U.S. Cl.
CPC ............ *G06F 21/604* (2013.01); *G06F 21/31* (2013.01); *G06F 21/6245* (2013.01)

(58) Field of Classification Search
CPC .... G06F 21/604; G06F 21/31; G06F 21/6245; G06F 21/6218; H04L 63/102; H04L 63/20; H04W 12/37
USPC .............................................................. 726/26
See application file for complete search history.

(56) References Cited

U.S. PATENT DOCUMENTS

| | | | | |
|---|---|---|---|---|
| 9,604,541 | B1 * | 3/2017 | Anter | B60K 35/22 |
| 9,900,315 | B2 | 2/2018 | Yusuf et al. | |
| 10,491,733 | B2 | 11/2019 | Feit et al. | |
| 11,797,701 | B1 * | 10/2023 | Angelo | G06F 16/26 |
| 2004/0267410 | A1 * | 12/2004 | Duri | H04L 63/20 701/1 |

(Continued)

FOREIGN PATENT DOCUMENTS

| | | | | |
|---|---|---|---|---|
| CN | 102740286 A | | 10/2012 | |
| CN | 104057919 A | * | 9/2014 | B60R 25/2081 |

(Continued)

OTHER PUBLICATIONS

GB/T 35273-2020, "Information security technology-Personal information security specification," State Administration for Market Regulation State Administration for Standardization, Mar. 6, 2020, 41 pages (with English abstract).

(Continued)

*Primary Examiner* — Jacob Lipman
(74) *Attorney, Agent, or Firm* — Fish & Richardson P.C.

(57) ABSTRACT

The present disclosure relates to data protection methods and vehicles. In an example method, a target vehicle may receive a first configuration file, and determine a first configuration policy based on the first configuration file. The first configuration policy may be used to configure a protection manner of user data associated with a first application. The target vehicle may perform a first operation according to the first configuration policy.

20 Claims, 10 Drawing Sheets

(56) References Cited

U.S. PATENT DOCUMENTS

| | | | | |
|---|---|---|---|---|
| 2015/0074819 | A1 | 3/2015 | Borenstein | |
| 2016/0330206 | A1* | 11/2016 | Xu | H04L 63/20 |
| 2019/0108356 | A1* | 4/2019 | Köhnke | H04L 63/102 |
| 2019/0312781 | A1* | 10/2019 | Kafzan | H04L 63/20 |

FOREIGN PATENT DOCUMENTS

| | | | | |
|---|---|---|---|---|
| CN | 106506876 | A | 3/2017 | |
| CN | 107426187 | A | 12/2017 | |
| CN | 107819737 | A | 3/2018 | |
| CN | 109074465 | A | 12/2018 | |
| CN | 110189517 | A | 8/2019 | |
| CN | 110971620 | A * | 4/2020 | H04L 63/02 |
| CN | 112513850 | A | 3/2021 | |

OTHER PUBLICATIONS

Extended European Search Report in European AppIn No. 21943587.2, dated Jun. 14, 2024, 7 pages.

* cited by examiner

DATA PROTECTION METHOD AND VEHICLE

CROSS-REFERENCE TO RELATED APPLICATIONS

This application is a continuation of International Application No. PCT/CN2021/098427, filed on Jun. 4, 2021, the disclosure of which is hereby incorporated by reference in its entirety.

TECHNICAL FIELD

This application relates to the field of internet of vehicle technologies, and in particular, to a data protection method and a vehicle.

BACKGROUND

With continuous development of the vehicle industry and sustained progress of electrification, intelligentization, networking, and sharing of vehicles, functions of the vehicles are becoming more complex. Correspondingly, a large quantity of sensors are disposed in an intelligent vehicle, and these sensors obtain a large amount of user data. In addition, a large quantity of pieces of application software are installed on the intelligent vehicle, and these pieces of application software use the user data. Some pieces of application software even collect or use, without user authorization, user data unrelated to corresponding services. Consequently, security of the user data is low.

Since users fail to perceive collection or processing (for example, transmission or storage) of user data, they may lack trust in user data protection mechanisms in the intelligent vehicles. In addition, current laws and policies clearly state that protection of personal data from users needs to be enhanced, and products that use personal data from the users need to comply with laws and regulations.

Therefore, how to improve a data protection capability of the intelligent vehicles, enhance security of user data, and enable users to perceive collection and processing of personal data is an urgent problem to be resolved.

SUMMARY

This application provides a data protection method and a vehicle, to improve a data protection capability of an intelligent vehicle, and enhance security of user data, so that a user can perceive collection and usage of personal data. This improves user experience.

According to a first aspect, an embodiment of this application provides a data protection method. The method may be applied to a target vehicle. In the method, the target vehicle receives a first configuration file, and determines a first configuration policy based on the first configuration file, where the first configuration policy is used to configure a protection manner of user data associated with a first application. The target vehicle performs a first operation according to the first configuration policy.

It should be understood that the first application may be one or more applications. This is not specifically limited in embodiments of this application.

In an embodiment of this application, the target vehicle may determine a corresponding configuration policy based on a received configuration file, so that the target vehicle may perform, according to the configuration policy, a corresponding protection operation on the user data associated with the first application. In this way, a data protection capability of the vehicle can be effectively improved, and the user data associated with the first application is protected. This effectively improves user experience.

The first operation may include one or more of operations such as data access control, data storage security control, data deletion, and data transmission security control. Correspondingly, the target vehicle may implement data access control, data storage security control, data deletion, data transmission security control, and the like on the user data associated with the first application.

In this way, the user data associated with the first application is protected from a plurality of dimensions, to effectively meet a protection requirement of user data of a user, and further improve user experience.

In a possible design, the first configuration file may include configuration information, so that the target vehicle obtains a first account associated with a current user, and performs authentication on the first account. After determining that authentication on the first account succeeds, the target vehicle may control a user interface to display the configuration information. The first account may be information such as a mobile phone number, a driving license number, or a facial identifier of the user. This is not specifically limited in embodiments of this application. It should be understood that the target vehicle performs authentication on the first account, to identify whether a first user is an authorized user and whether the first user is a vehicle owner.

In this design, the target vehicle performs authentication on the first account of the current user, so that it is ensured that a user who performs an authorization operation on the user data associated with the first application is an authorized user, and subsequent authorization operations performed by different authorized users on the user data associated with the first application can be distinguished. This effectively reduces an unauthorized management operation performed by an unauthorized user on an application in the target vehicle, and improves security of the target vehicle.

In a possible design, the configuration information includes a data protection type and/or a data protection manner, and a process in which the target vehicle determines the configuration policy based on the first configuration file may be: The target vehicle receives a first instruction entered by the current user, where the first instruction indicates a first data protection type selected by the current user from the data protection types for the user data associated with the first application, and/or a first data protection manner selected by the current user from the data protection manner for the user data associated with the first application; and further, the target vehicle may determine the first configuration policy based on the first data protection type and/or the first data protection manner.

It should be noted that the first instruction may be understood as an authorization operation performed by the current user on the user data associated with the first application. To be specific, the authorization operation herein refers to the first data protection type and/or the first data protection manner selected by the current user from the data protection type and/or the data protection manner in the configuration information for the user data associated with the first application. The data protection type may be understood as a type of data that needs to be protected in the user data associated with the first application, for example, voice data, location data, or image data of a user. This is not specifically limited herein. The data protection manner may be understood as information such as access control, storage security control, deletion setting, transmission security control, or the like for data of one or more data types in the user data associated with the first application.

In this design, the target vehicle may interact with the current user, so that the target vehicle may determine the first configuration policy based on the first data protection type and/or the first data protection manner that are/is determined based on the authorization operation of the user. In this way, the user participates in a process of formulating the configuration policy, so that the user can perceive collection and processing of personal data. This effectively meets a personalized data protection requirement of the user and further improves user experience.

In a possible design, only after detecting a trigger event, the target vehicle controls the user interface to display the configuration information. The trigger event may be any one of detecting a user who uses the target vehicle for the first time, detecting an update of one or more pieces of application software associated with the target vehicle, detecting the user data associated with the first application, or detecting a change of a data protection policy associated with the first application.

In this design, when detecting a preset trigger event, the target vehicle displays the configuration information, so that the user can update the authorization operation on the user data associated with the first application in real time. In this way, the data protection manner of the user data associated with the first application can dynamically change. This effectively meets a data protection requirement of the user.

In a possible design, the target vehicle may further obtain an operation record of the current user, and generate a configuration log of the current user, where the configuration log is used to update the first configuration file.

In this design, the target vehicle may obtain the operation record of the current user, and generate the configuration log, to help subsequently optimize the first configuration file, so that the first configuration file better meets a requirement of the user for protecting the user data associated with the first application. This further effectively improves user experience.

In a possible design, the target vehicle may receive a second instruction of the current user, determine a second configuration file of the current user (namely, a preference configuration of the current user) in response to the second instruction, determine a second configuration policy based on the second configuration file, and perform a second operation based on the second configuration policy. It should be understood that the second operation may be an operation, for example, data access control, data storage security control, data deletion, or data transmission security control performed by the target vehicle on one or more applications in the target vehicle. This is not specifically limited in this application.

In this design, the target vehicle may receive an instruction of the current user, and determine a preference configuration of the current user in response to the instruction. Further, the target vehicle may generate a new configuration policy based on the preference configuration, and perform a corresponding operation based on the new configuration policy. In this way, the configuration policy better meets a requirement of the current user for protecting the data of the user. This effectively improves user experience.

In a possible design, the target vehicle may further receive a third instruction of the current user that indicates to delete the user data associated with the first application, and delete, in response to the third instruction, the user data associated with the first application. It should be understood that the user data associated with the first application that is deleted herein may be all user data associated with the first application, or may be user data of a specific type (for example, one or more of voice data, location data, and image data) associated with the first application. This is not specifically limited in embodiments of this application.

In this design, the target vehicle may delete, based on an instruction entered by the user, data that the user wants to delete. In this way, a requirement of the user for managing the personal data is effectively met, and user experience is further improved.

In a possible design, when detecting that storage duration of the user data associated with the first application exceeds preset duration, the target vehicle may automatically delete the user data associated with the first application.

In this design, when detecting that the storage duration of the user data associated with the first application exceeds the preset duration, the target vehicle automatically deletes the user data associated with the first application. In this way, a case in which the user data associated with the first application is illegally retained by a third-party service provider corresponding to the first application is effectively avoided. This further enhances a data protection capability of the target vehicle.

In a possible design, the user data associated with the first application includes a plurality of types of data, and the target vehicle may further determine first-type user data that is in the plurality of types of user data and that is being used by the first application, and display the first-type user data and an icon of the first application on the user interface.

In this design, a usage status of the user data is visualized, and the user can clearly know the usage status of the data of the user. This effectively improves user experience.

According to a second aspect, an embodiment of this application further provides a data protection method. The method is applied to a central controller, the central controller includes a central controller and an agent controller, and the method includes: The central controller receives a first configuration file, and determines a first configuration policy based on the first configuration file, where the first configuration policy is used to configure a protection manner of user data associated with a first application; and the central controller sends the first configuration policy to the agent controller, so that the agent controller can perform a first operation according to the first configuration policy. It should be understood that the first application may be one or more applications. This is not specifically limited in embodiments of this application.

In an embodiment of this application, the central controller may determine a corresponding configuration policy based on a received configuration file, so that the agent controller performs, according to the configuration policy, a corresponding protection operation on the user data associated with the first application. In this way, the central controller and the agent controller in the target vehicle collaborate to perform data protection, so that a data protection capability of the vehicle can be effectively improved, and the user data associated with the first application is protected. This effectively improves user experience.

The first operation may include one or more of operations such as data access control, data storage security control, data deletion, and data transmission security control. Correspondingly, the agent controller may implement data access control, data storage security control, data deletion, data transmission security control, and the like on the user data associated with the first application. In this way, the user data associated with the first application is protected from a plurality of dimensions, to effectively meet a protection requirement of the user data, and further improve user experience.

In a possible design, the first configuration file may include configuration information, so that the central controller obtains a first account associated with a current user, and performs authentication on the first account. After determining that authentication on the first account succeeds, the target vehicle may control a user interface to display the configuration information. The first account may be information such as a mobile phone number, a driving license number, or a facial identifier of the user. This is not specifically limited in embodiments of this application. It should be understood that the central controller performs authentication on the first account, to identify whether a first user is an authorized user and whether the first user is a vehicle owner.

In this design, the central controller performs authentication on the first account of the current user, so that it is ensured that a user who performs an authorization operation on the user data associated with the first application is an authorized user, and subsequent authorization operations performed by different authorized users on the user data associated with the first application can be distinguished. This effectively reduces unauthorized management operations performed by an unauthorized user on an application in the central controller, and improves security of the central controller.

In a possible design, the configuration information includes a data protection type and/or a data protection manner, and a process in which the central controller determines the configuration policy based on the first configuration file may be: The central controller receives a first instruction entered by the current user, where the first instruction indicates a first data protection type selected by the current user from the data protection type for the user data associated with the first application, and/or a first data protection manner selected by the current user from the data protection manner for the user data associated with the first application. Further, the central controller may determine the first configuration policy based on the first data protection type and/or the first data protection manner.

It should be noted that the first instruction may be understood as an authorization operation performed by the current user on the user data associated with the first application. To be specific, the authorization operation herein refers to the first data protection type and/or the first data protection manner selected by the current user from the data protection type and/or the data protection manner in the configuration information for the user data associated with the first application. The data protection type may be understood as a type of data that needs to be protected in the user data associated with the first application, for example, voice data, location data, or image data of a user. This is not specifically limited herein. The data protection manner may be understood as information such as access control, storage security control, deletion setting, transmission security control, or the like for data of one or more data types in the user data associated with the first application.

In this design, the central controller may interact with the current user, so that the central controller may determine the first configuration policy based on the first data protection type and/or the first data protection manner that are/is determined based on the authorization operation of the user. In this way, the user participates in a process of formulating the configuration policy, so that the user can perceive collection and processing of personal data. This effectively meets a personalized data protection requirement of the user and further improves user experience.

In a possible design, only after detecting a trigger event, the central controller controls the user interface to display the configuration information. The trigger event may be any one of detecting a user who uses the central controller for the first time, detecting an update of one or more pieces of application software associated with the central controller, detecting the user data associated with the first application, or detecting a change of a data protection policy associated with the first application.

In this design, when detecting a preset trigger event, the central controller displays the configuration information, so that the user can update the authorization operation on the user data associated with the first application in real time. In this way, the data protection manner of the user data associated with the first application can dynamically change. This effectively meets a data protection requirement of the user.

In a possible design, the central controller may further obtain an operation record of the current user, and generate a configuration log of the current user, where the configuration log is used to update the first configuration file.

In this design, the central controller may obtain the operation record of the current user, and generate the configuration log, to help subsequently optimize the first configuration file, so that the first configuration file better meets a requirement of the user for protecting the user data associated with the first application. This further effectively improves user experience.

In a possible design, the agent controller is associated with the first application. The central controller receives a second instruction of the current user, and determines a second configuration file of the current user (namely, a preference configuration of the current user) in response to the second instruction. After determining a second configuration policy based on the second configuration file, the central controller may send the second configuration policy to the agent controller. The agent controller performs a second operation based on the second configuration policy. It should be understood that the second operation may be an operation, for example, data access control, data storage security control, data deletion, or data transmission security control performed by the agent controller on one or more applications in the target vehicle. This is not specifically limited in this application.

In this design, the central controller may receive an instruction of the current user, and determine the preference configuration of the current user in response to the instruction. In this way, the central controller may generate a new configuration policy based on the preference configuration, and send the new configuration policy to the agent controller, so that the agent controller performs a corresponding operation based on the new configuration policy. In this way, the configuration policy better meets a requirement of the current user for protecting the data of the user. This effectively improves user experience.

In a possible design, the central controller may further receive a third instruction of the current user, and send the third instruction to the agent controller. If the third instruction indicates to delete the user data associated with the first application, the agent controller may delete, in response to the third instruction, the user data associated with the first application. It should be understood that the user data associated with the first application that is deleted herein may be all user data associated with the first application, or may be user data of a specific type (for example, one or more of voice data, location data, and image data) associated with the first application. This is not specifically limited in embodiments of this application.

In this design, the agent controller in the target vehicle may delete, based on an instruction entered by the user, data that the user wants to delete. In this way, a requirement of the user for managing the personal data is effectively met, and user experience is further improved.

In a possible design, when the central controller detects that storage duration of the user data associated with the first application exceeds preset duration, the central controller may generate a fourth instruction, and send the fourth instruction to the agent controller. The agent controller deletes, according to the fourth instruction, the user data associated with the first application.

In this design, when detecting that the storage duration of the user data associated with the first application exceeds the preset duration, the central controller in the target vehicle controls the agent controller to automatically delete the user data associated with the first application. In this way, a case in which the user data associated with the first application is illegally retained by a third-party service provider corresponding to the first application is effectively avoided. This further enhances a data protection capability of the target vehicle.

In a possible design, the user data associated with the first application includes a plurality of types of data, and the central controller may further determine first-type user data that is in the plurality of types of user data and that is being used by the first application, and display the first-type user data and an icon of the first application on the user interface.

In this design, a usage status of the personal data of the user is visualized, and the user can clearly know the usage status of the data of the user. This effectively improves user experience.

According to a third aspect, an embodiment of this application further provides a data protection method. The method is applied to a server, and the method includes: determining a first configuration file; and sending the first configuration file to a target vehicle, where the first configuration file is used by the target vehicle to determine a first configuration policy, and the first configuration policy is used to configure a protection manner of user data associated with a first application. It should be understood that the server may be a cloud server, or may be a server of a third-party service provider. This is not specifically limited in embodiments of this application. The first application may be one or more applications, the first configuration file may include configuration information, and the configuration information includes a data protection type and/or a data protection manner.

It should be noted that, when detecting that the first configuration file is updated, the server may automatically send an updated first configuration file to the target vehicle.

In a possible design, the server may further receive a configuration log of a current user, update the first configuration file based on the configuration log, and send the updated first configuration file to the target vehicle, so that the target vehicle updates the first configuration policy.

According to a fourth aspect, an embodiment of this application provides a data protection apparatus. For example, the apparatus may include:

a transceiver module, configured to receive a first configuration file; and a processing module, configured to: determine a first configuration policy based on the first configuration file, and perform a first operation according to the first configuration policy, where the first configuration policy is used to configure a protection manner of user data associated with a first application.

In addition, in this aspect, for another optional design of the data protection apparatus, refer to related content in the first aspect. Details are not described herein again.

In the fourth aspect, the transceiver module may alternatively be a transceiver, and the processing module may alternatively be a processor. This is not limited in embodiments of this application.

According to a fifth aspect, an embodiment of this application provides a data protection apparatus. For example, the apparatus may include:

a processing module, configured to determine a first configuration file; and a transceiver module, configured to send the first configuration file to a target vehicle, where the first configuration file is used by the target vehicle to determine a first configuration policy, and the first configuration policy is used to configure a protection manner of user data associated with a first application.

In addition, in this aspect, for another optional design of the data protection apparatus, refer to related content in the third aspect. Details are not described herein again.

In the fifth aspect, the transceiver module may alternatively be a transceiver, and the processing module may alternatively be a processor. This is not limited in embodiments of this application.

According to a sixth aspect, an embodiment of this application provides a vehicle. The vehicle may include a processor, and the processor is configured to perform the method according to any one of the first aspect or the possible designs of the first aspect, or perform the method according to any one of the second aspect or the possible designs of the second aspect.

In a possible design, the vehicle further includes a memory, configured to store a computer program or instructions.

In a possible design, the vehicle further includes a transceiver, configured to receive or send information.

According to a seventh aspect, an embodiment of this application provides a server. The server includes a processor, and the processor is configured to perform the method according to any one of the second aspect or the possible designs of the second aspect.

In a possible design, the server is a single server or a server cluster including a plurality of sub servers.

In a possible design, the server further includes a memory, configured to store a computer program or instructions.

In a possible design, the server further includes a transceiver, configured to receive or send information.

According to an eighth aspect, an embodiment of this application provides a chip system. The chip system includes at least one processor. When program instructions are executed on the at least one processor, the method according to any one of the first aspect, the second aspect, or the optional designs of the first aspect or the second aspect is implemented.

In a possible design, the chip system further includes a communication interface, and the communication interface is configured to input or output information.

In a possible design, the chip system further includes a memory. The memory is coupled to the processor through the communication interface, and is configured to store the foregoing instructions, so that the processor reads, through the communication interface, the instructions stored in the memory.

In a possible design, the processor may be a processing circuit. This is not limited in this application.

According to a ninth aspect, an embodiment of this application further provides a data protection system. The system includes:

- a target vehicle, configured to perform the method according to any one of the first aspect or the possible designs of the first aspect; and
- a server, configured to perform the method according to any one of the third aspect or the possible designs of the third aspect.

According to a tenth aspect, an embodiment of this application further provides a computer program product including instructions. When the computer program product runs on the foregoing target vehicle, the data protection method according to any one of the first aspect or the possible designs of the first aspect is performed, or the data protection method according to any one of the second aspect or the possible designs of the second aspect is performed; or when the computer program product runs on the foregoing server, or the data protection method according to any one of the third aspect or the possible designs of the third aspect is performed.

According to an eleventh aspect, an embodiment of this application provides a computer-readable storage medium. The computer-readable storage medium stores a computer program. When the computer program is run, the data protection method according to any one of the first aspect or the possible designs of the first aspect, or any one of the second aspect or the possible designs of the second aspect, or any one of the second aspect or the possible designs of the second aspect is implemented.

For beneficial effects of the third aspect to the eleventh aspect, refer to technical effects that can be achieved by corresponding designs in the first aspect. Details are not described herein again.

DESCRIPTION OF EMBODIMENTS

Figure 1:
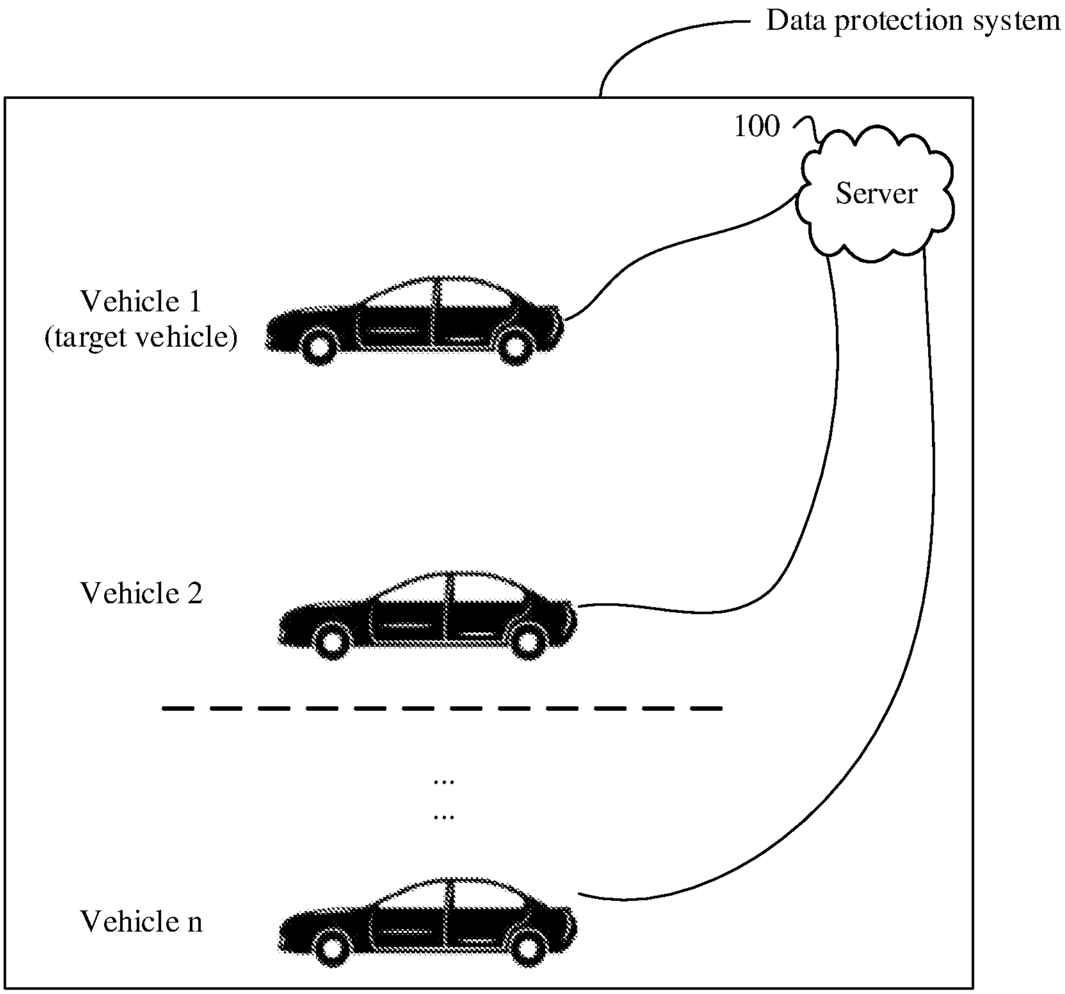
FIG. 1 is a schematic diagram 1 of a scenario to which an embodiment of this application is applicable.

To make the objectives, technical solutions, and advantages of embodiments of this application clearer, the following describes embodiments of this application in detail with reference to the accompanying drawings.

In embodiments of this application, "at least one" means one or more, and "at least two" means two or more. The term "and/or" describes an association relationship between associated objects, and represents that three relationships may exist. For example, A and/or B may represent the following cases: Only A exists, both A and B exist, and only B exists, where A and B may be singular or plural. The character "/" usually indicates an "or" relationship between the associated objects. At least one of the following items (pieces) or a similar expression thereof refers to any combination of these items, including any combination of singular items (pieces) or plural items (pieces). For example, at least one of a, b, or c may represent: a, b, c, a and b, a and c, b and c, or a, b, and c, where a, b, and c may be singular or plural.

Ordinal numerals such as "first" and "second" in embodiments of this application are used to distinguish between a plurality of objects, and are not intended to limit sizes, shapes, a sequence, a time sequence, priorities, or importance degrees of the plurality of objects. For example, a first instruction and a second instruction are merely used to distinguish between different instructions, but do not indicate different priorities or importance degrees of the instructions.

Currently, a large quantity of sensors are disposed in an intelligent vehicle, and these sensors obtain a large amount of user data. In addition, a large quantity of pieces of application software are installed on the intelligent vehicle, and these pieces of application software use the user data. Some pieces of application software even collect or use, without user authorization, user data unrelated to a service of the application software. Consequently, security of user data is low.

However, a user fails to perceive collection or processing (for example, transmission or storage) of personal data. As a result, the user lacks trust in user data protection in the intelligent vehicle. In particular, after obtaining the user data, the intelligent vehicle transmits the user data to a third-party service provider. If the third-party service provider and a vehicle enterprise leak the user data, an economic loss may be caused to the user. If an unauthorized person uses the user data to remotely control the intelligent vehicle, life safety of the user is threatened. In addition, after obtaining the user data, even if the intelligent vehicle stores only the user data locally, and does not upload the user data to the third-party service provider, the user data may be leaked. For example, in a maintenance scenario, maintenance personnel export the user data from the intelligent vehicle for private purposes.

Therefore, how to improve a data protection capability of the intelligent vehicle, enable the user to perceive personal data collection and processing, and reduce a risk of user data leakage, to improve user experience is an urgent problem to be resolved.

To resolve the foregoing technical problem, embodiments of this application provide a data protection method. The method may be applied to a target vehicle. The target vehicle may determine a first configuration policy based on a received first configuration file. Further, the target vehicle may configure, according to the first configuration policy, a protection manner of user data associated with a first application, and perform a corresponding protection operation. In this way, a data protection capability of the vehicle can be effectively improved, and the user data associated with the first application is protected. This effectively improves user experience.

It should be understood that the data protection method provided in embodiments of this application is applied to the target vehicle, and may be specifically applied to a vehicle having a data protection function, or may be applied to a component in a vehicle having a data protection function. The component in the vehicle includes but is not limited to: a vehicle-mounted terminal, a vehicle-mounted controller, a vehicle-mounted module, a vehicle-mounted assembly, a vehicle-mounted component, a vehicle-mounted chip, a vehicle-mounted unit, and another sensor, for example, a vehicle-mounted radar or a vehicle-mounted camera. The vehicle may implement the data protection method provided in this application by using the vehicle-mounted terminal, the vehicle-mounted controller, the vehicle-mounted module, the vehicle-mounted assembly, the vehicle-mounted component, the vehicle-mounted chip, the vehicle-mounted unit, the vehicle-mounted radar, or the camera.

Before the technical solutions provided in embodiments of this application are described in detail, a system architecture to which embodiments of this application are applicable is first described.

FIG. 1 is a schematic diagram 1 of a scenario to which an embodiment of this application is applicable. An architecture of a data protection system shown in FIG. 1 includes at least one vehicle and a server 100. In FIG. 1, n vehicles are shown, and are respectively a vehicle 1, a vehicle 2, . . . , and a vehicle n, where n is an integer greater than or equal to 2. Any one of the n vehicles may be used as a target vehicle. In FIG. 1, for example, the vehicle 1 is used as a target vehicle.

The server 100 may be a cloud server of an original equipment manufacturer (original equipment manufacturer, OEM), or may be a server of a third-party service provider (for example, a service provider that provides a voice entertainment service). This is not specifically limited in embodiments of this application. The server is a single server or a server cluster including a plurality of subservers. This is not specifically limited herein.

In a possible implementation, the server 100 may determine a first configuration file, and send the first configuration file to the target vehicle. Further, the target vehicle (namely, the vehicle 1) may determine a first configuration policy based on the received first configuration file, and perform a first operation (that is, configure a protection manner of user data associated with a first application) according to the first configuration policy.

It should be understood that the first configuration file may be uploaded by an OEM engineer to the server 100. In an embodiment of this application, the first configuration file may include configuration information, and the configuration information may include a data protection type and/or a data protection manner. The data protection type may be understood as a type of data that needs to be protected in the user data associated with the first application, for example, voice data, location data, or image data of a user. This is not specifically limited herein. The data protection manner may be understood as access control, storage security control, deletion setting, transmission security control, or the like for data of one or more data types in the user data associated with the first application.

In a possible design, the server 100 may further receive a configuration log of a current user, update the first configuration file based on the configuration log, and send an updated first configuration file to the target vehicle (namely, the vehicle 1). Further, the target vehicle (namely, the vehicle 1) may update the first configuration policy based on the received configuration file, and perform a corresponding operation (that is, reconfigure the protection manner of the user data associated with the first application) based on an updated first configuration policy.

It should be noted that the data protection method provided in an embodiment of this application may be applicable to a conventional central gateway-type vehicle-mounted domain controller architecture, or may be applicable to a new ring network architecture. In the conventional central gateway vehicle-mounted domain controller architecture, a plurality of domain controllers (for example, an entertainment domain controller and an automatic driving domain controller) are disposed in the target vehicle, and one or more electronic control units (electronic control units, ECUs) are mounted to each domain controller. In the new ring network architecture, a concept of a domain is weakened. One vehicle domain controller (vehicle domain controller, VDC) and a plurality of vehicle identification units (vehicle identification units, VIUs) are disposed, and a plurality of ECUs are mounted to each VIU.

When the data protection method provided in this embodiment of this application is applied to the conventional central gateway-type vehicle-mounted domain controller architecture or the new ring network architecture, a plurality of controllers in the target vehicle may collaborate to protect the user data. This further improves a data protection capability of an intelligent vehicle.

Figure 2:
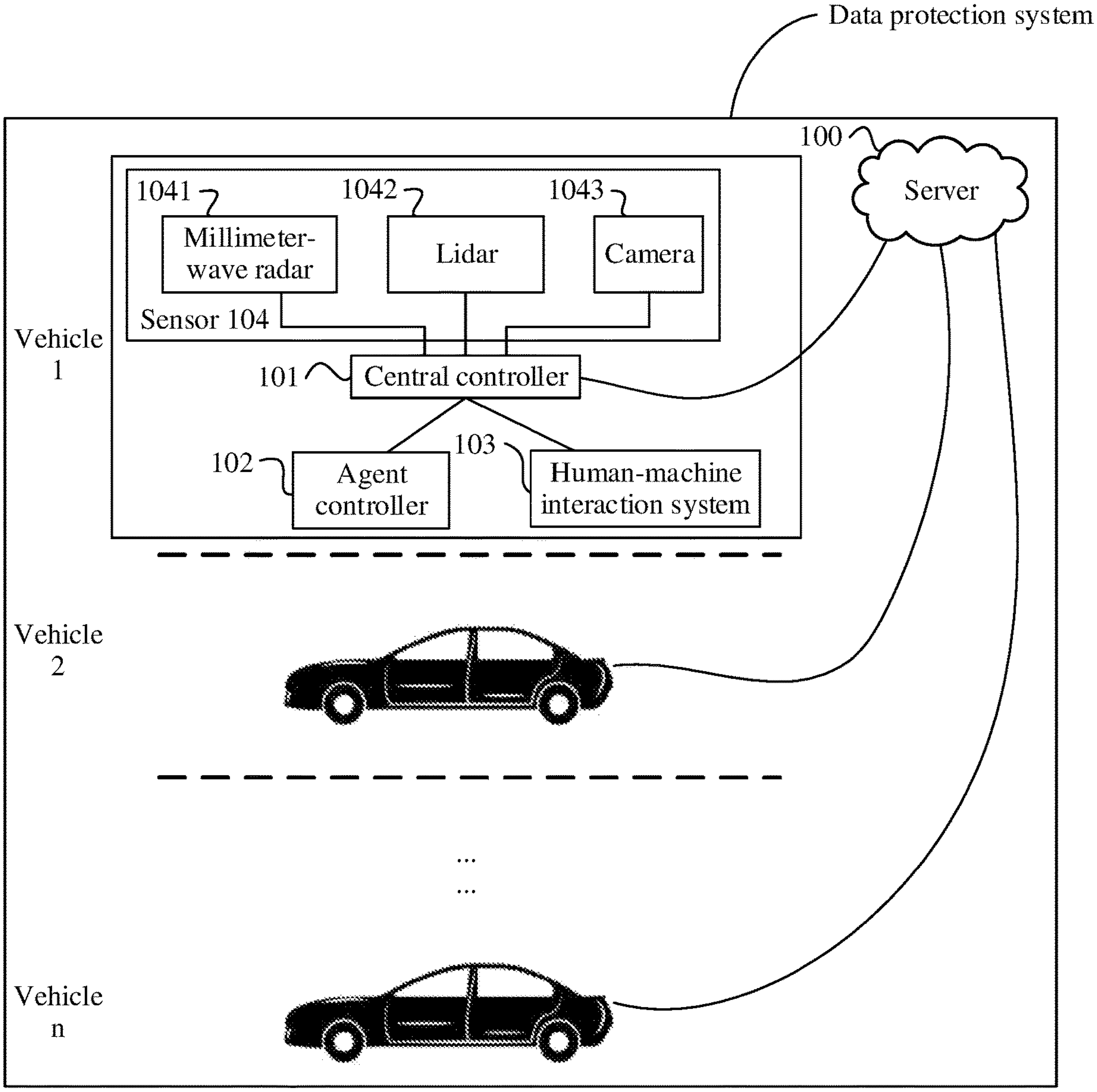
FIG. 2 is a schematic diagram 2 of a scenario to which an embodiment of this application is applicable.

For example, FIG. 2 is a schematic diagram 2 of a scenario to which an embodiment of this application is applicable. In FIG. 2, a target vehicle (namely, a vehicle 1) may include a central controller 101, an agent controller 102, a human-computer interaction system 103, and a sensor 104.

The central controller 101 may be configured to receive a first configuration file, determine a first configuration policy based on the first configuration file, and send the first configuration policy to the agent controller 102. The first configuration policy may be used to configure a protection manner of user data associated with a first application. The central controller 101 may be a controller that is disposed in the target vehicle and that has a strong computing capability, and is specifically implemented by a processor. The processor includes a central processing unit (central processing unit, CPU) or a device or module that has a processing function.

The agent controller 102 is associated with the first application, so that the agent controller 102 may be configured to: receive the first configuration policy from the central controller 101, and perform a first operation according to the first configuration policy, to implement corresponding protection on the user data associated with the first application. The first operation includes but is not limited to one or more of data access control, data storage security control, data deletion, and data transmission security control of the user data associated with the first application. It should be noted that, that the agent controller 102 is associated with the first application may be understood as that the agent controller 102 is preconfigured to perform a service operation and a data protection operation that are associated with the first application.

The human-computer interaction system 103 is configured to provide an audio and video manner in which the target vehicle interacts with the user, and may be configured to: obtain an authorization operation performed by the user on the user data associated with the first application, and transfer instruction information corresponding to the authorization operation to the central controller 101.

The sensor 104 may include one or more of the following devices: at least one millimeter-wave radar 1041, at least one lidar 1042, and at least one camera 1043. The millimeter-wave radar 1041 and the lidar 1042 may be configured to collect environment data around the target vehicle, and send the environment data to the central controller 101 or the agent controller 102. The camera 1043 may be configured to collect image data around the target vehicle or image data of the user in the target vehicle, and send the image data to the central controller 101 or the agent controller 102.

Based on the data protection system shown in FIG. 2, the central controller 101 in the target vehicle may receive the first configuration file from the server 100, determine the first configuration policy based on the first configuration file, and send the first configuration policy to the agent controller 102. The agent controller 102 performs the first operation (namely, a protection operation on the user data associated with the first application) according to the first configuration policy. In this way, a plurality of controllers in the target vehicle collaborate to perform data protection, so that a data protection capability of the intelligent vehicle can be effectively improved. This improves user experience.

It should be understood that methods for performing data protection by a vehicle 2 and a vehicle 3 are similar to a method for performing data protection by the vehicle 1. Mutual reference may be made for the methods. Details are not described again herein.

The following describes specific implementations of the central controller 101 and the agent controller 102 with reference to specific examples.

Figure 3A:
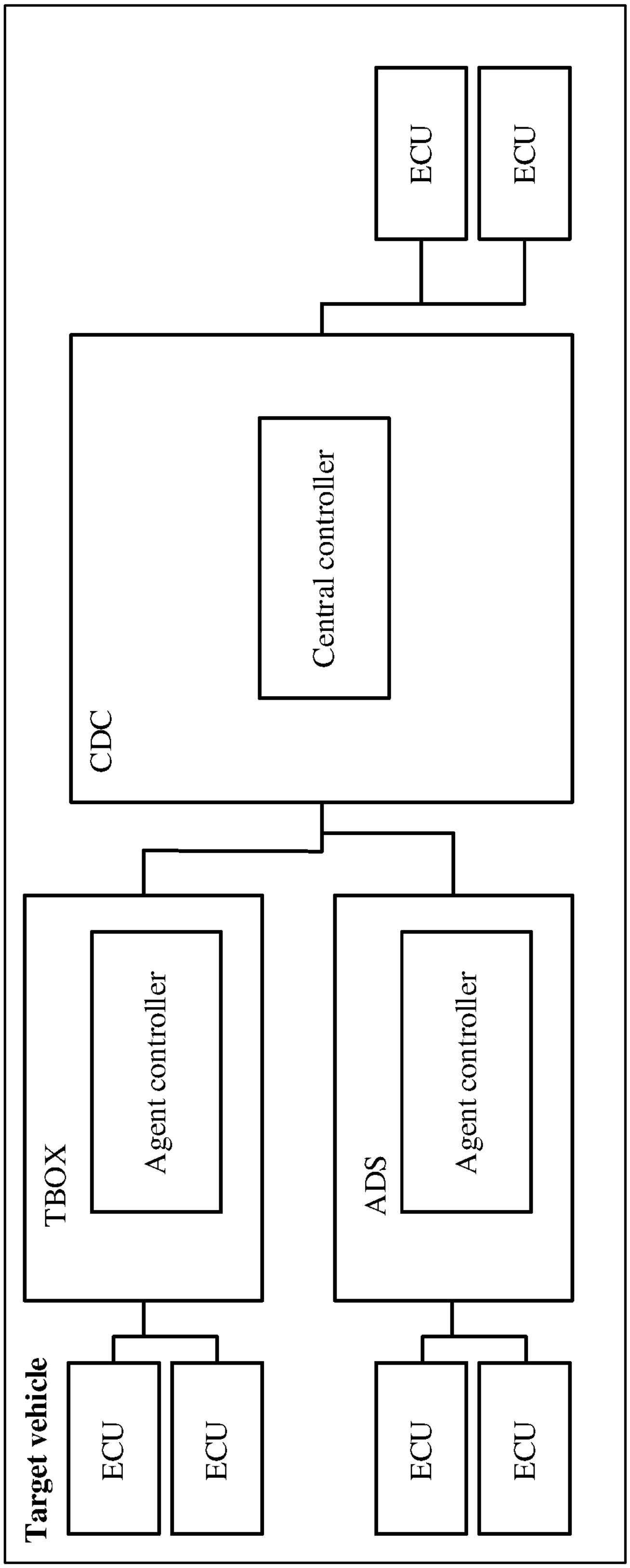
FIG. 3A is a schematic diagram 1 of an architecture of a target vehicle according to an embodiment of this application.

Example 1: When an architecture of the target vehicle is a conventional central gateway-type vehicle-mounted domain controller architecture shown in FIG. 3A, and the first application is map navigation software, the central controller 101 may be an intelligent cockpit domain controller (cockpit domain controller, CDC), and the agent controller 102 may be a telematics box (telematics BOX, TBOX).

Figure 3B:
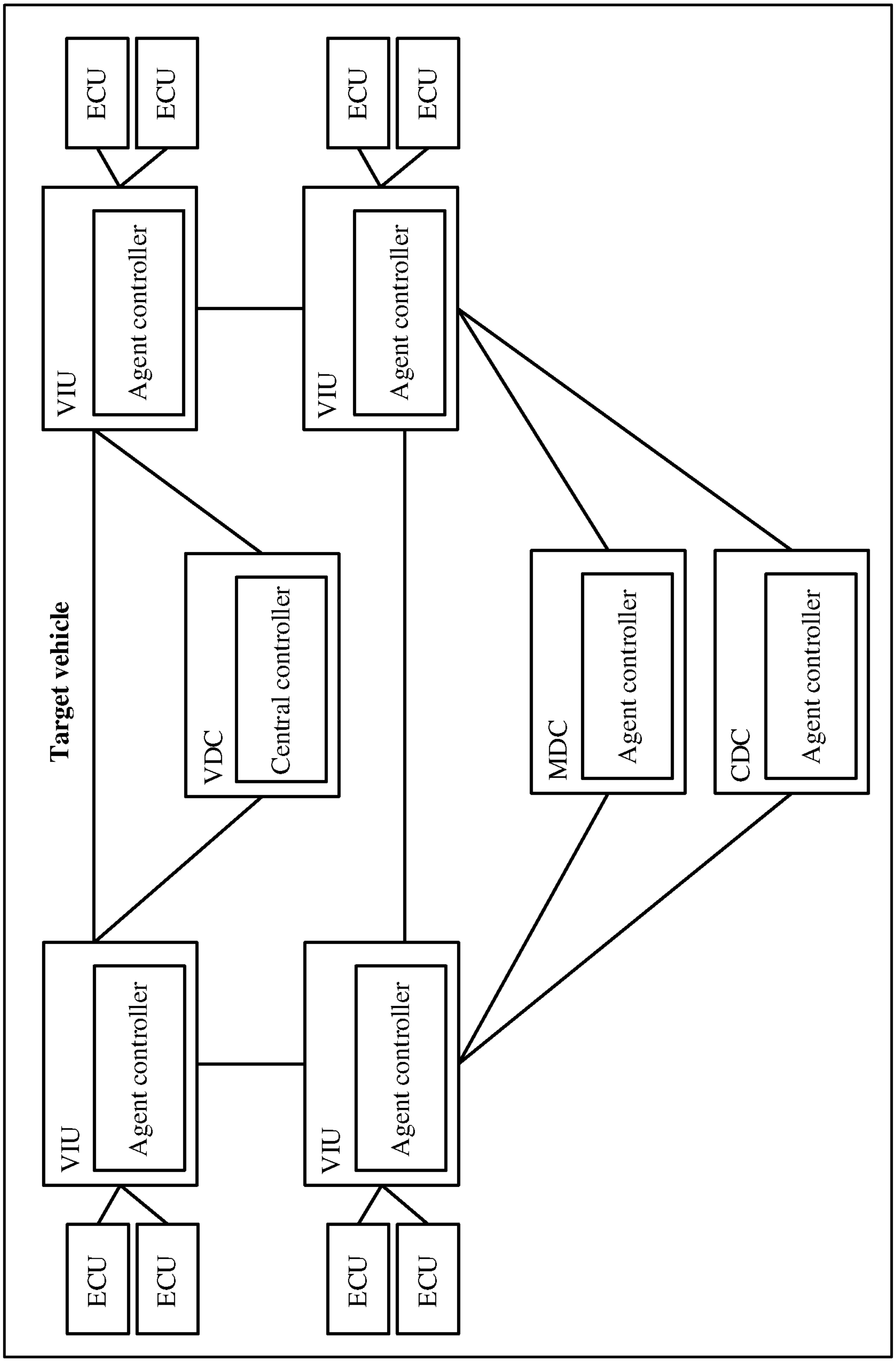
FIG. 3B is a schematic diagram 2 of an architecture of a target vehicle according to an embodiment of this application.

Example 2: When an architecture of the target vehicle is a new ring network architecture shown in FIG. 3B, and the first application is map navigation software, the central controller 101 may be a VDC, and the agent controller 102 may be a CDC, a VIU, or a multi domain controller (multi domain controller, MDC).

It should be noted that there may be one or more central controllers and agent controllers in the target vehicle. This is not specifically limited in embodiments of this application.

Figure 3C:
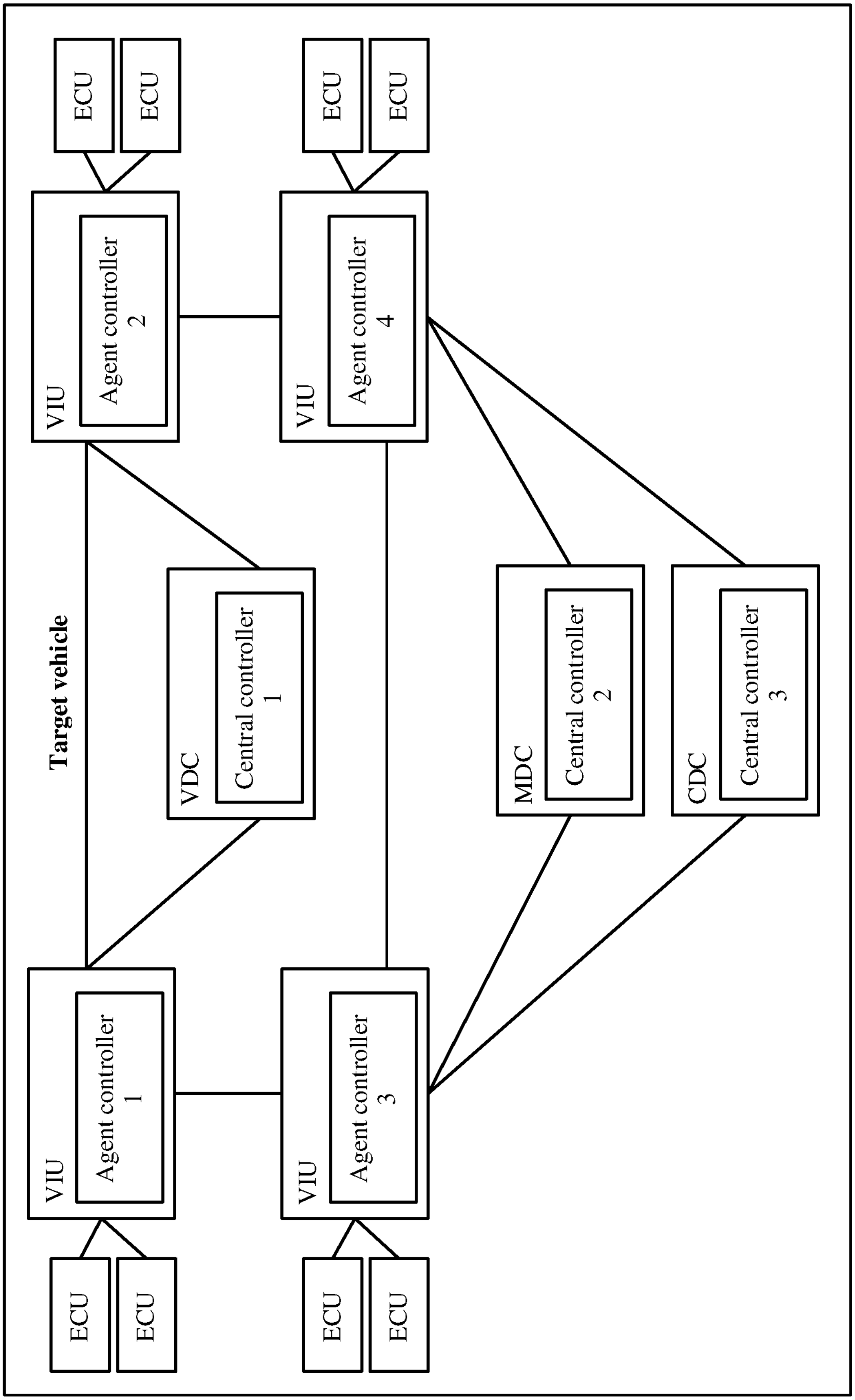
FIG. 3C is a schematic diagram 3 of an architecture of a target vehicle according to an embodiment of this application.

Example 3: Refer to FIG. 3C. A central controller 1 (namely, a VDC), a central controller 2 (namely, an MDC), a central controller 3 (namely, a VDC), and a plurality of agent controllers are disposed in the target vehicle.

The central controller 1 is associated with an agent controller 1 and an agent controller 2. Therefore, after receiving a configuration file 1 and generating a configuration policy 1, the central controller 1 may deliver the configuration policy 1 to the agent controller 1 and the agent controller 2, so that the agent controller 1 or the agent controller 2 performs a corresponding data protection operation.

The central controller 2 is associated with an agent controller 3 and an agent controller 4. Therefore, after receiving a configuration file 2 and generating a configuration policy 2, the central controller 2 may deliver the configuration policy 2 to the agent controller 3 and the agent controller 4, so that the agent controller 3 or the agent controller 4 performs a corresponding data protection operation.

The central controller 3 is associated with the agent controller 3 and the agent controller 4. Therefore, after receiving a configuration file 3 and generating a configuration policy 3, the central controller 2 may deliver the configuration policy 3 to the agent controller 3 and the agent controller 4, so that the agent controller 3 or the agent controller 4 performs a corresponding data protection operation.

It should be understood that the foregoing is merely an example instead of a limitation of the central controller and the agent controller. In actual application, there are more central controllers and agent controllers.

The foregoing describes the scenarios and the architecture to which embodiments of this application are applicable. The following describes in detail the data protection method provided in embodiments of this application with reference to the accompanying drawings.

Embodiment 1

Figure 4:
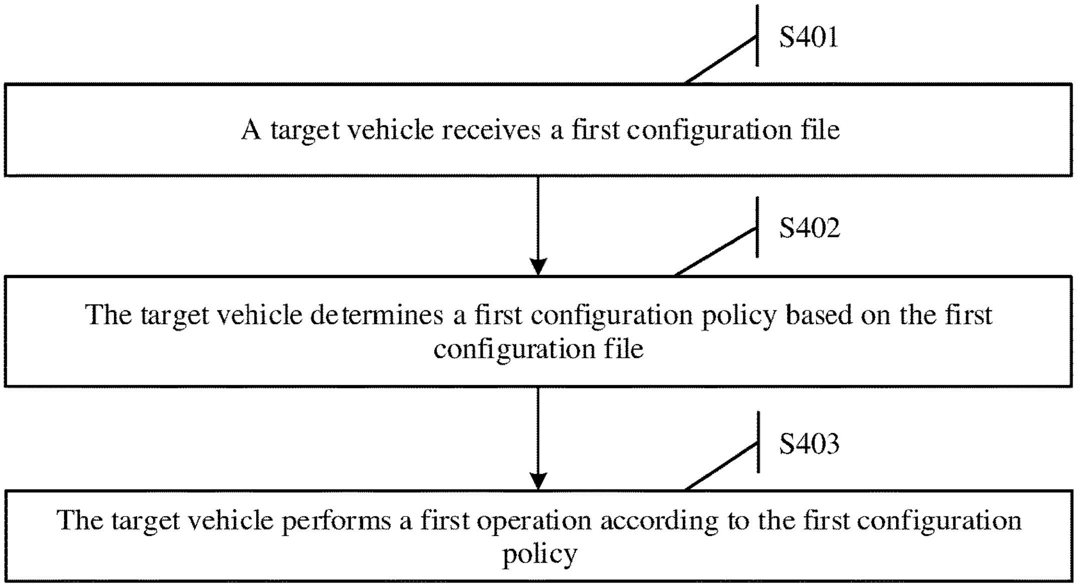
FIG. 4 is a schematic flowchart of a data protection method according to an embodiment of this application.

FIG. 4 is a schematic flowchart of a data protection method according to an embodiment of this application. The method may be applied to the scenario shown in FIG. 1, and the method includes the following steps.

S401: A target vehicle receives a first configuration file.

In this embodiment of this application, the target vehicle may receive the first configuration file from a server, or may receive the first configuration file from a third-party server. This is not specifically limited in embodiments of this application.

S402: The target vehicle determines a first configuration policy based on the first configuration file.

In this embodiment of this application, the first configuration policy is used to configure a protection manner of user data associated with a first application.

The first application may be one or more applications installed in the target vehicle. For example, the first application may be a map navigation application, a vehicle-mounted central control entertainment application, or a vehicle-mounted communication module system application. A specific type of the first application is not limited in embodiments of this application.

The user data associated with the first application may be one or more types of user data, for example, may be location data associated with the first application, may be location data and voice data that are associated with the first application, or may be location data, voice data, and image data that are associated with the first application. This is not specifically limited in embodiments of this application.

In this embodiment of this application, the first configuration file may include configuration information, and the configuration information may include a data protection type and/or a data protection manner. The data protection type may be understood as a type of data that needs to be protected in the user data associated with the first application, for example, voice data, location data, or image data of a user. This is not specifically limited herein. The data protection manner may be understood as access control, storage security control, deletion setting, transmission security control, or the like for data of one or more types in the user data associated with the first application.

To ensure that a user who performs an authorization operation on the user data associated with the first application is an authorized user, in a possible implementation, before the target vehicle determines the first configuration policy, the target vehicle may obtain a first account associated with a current user, and perform authentication on the first account. When determining that authentication on the first account succeeds, the target vehicle controls a user interface to display the configuration information, or when authentication on the first account fails, the target vehicle does not display the configuration information. In this way, the target vehicle performs authentication on the first account of the current user, so that it is ensured that the user who performs the authorization operation on the user data associated with the first application is an authorized user, and authorization operations performed by different authorized users on the user data associated with the first application can be distinguished. This effectively reduces an unauthorized management operation performed by an unauthorized user on an application in the target vehicle, and improves security of the target vehicle.

It should be understood that the first account associated with the current user may be a mobile phone number of the user, a driving license number of the user, a facial identifier of the user, or the like. This is not specifically limited in embodiments of this application. The user interface in embodiments of this application may be implemented by the human-computer interaction system 103 in FIG. 1.

Optionally, the data protection manner in the configuration information may also be understood as a protection mode for the user data associated with the first application, for example, a vehicle owner mode or a guest mode. In the vehicle owner mode, the data protection type and the data protection manner of the user data associated with the first application in the target vehicle are set based on a preference of a vehicle owner. In the guest mode, the data protection type and the data protection manner of the user data associated with the first application in the target vehicle are set by default. Correspondingly, when the target vehicle performs authentication on the first account associated with the current user, if it is determined that the current user is the vehicle owner, the target vehicle controls the user interface to display the vehicle owner mode, or if it is determined that the current user is not the vehicle owner, the target vehicle controls the user interface to display the guest mode. In this way, different configuration information is displayed for different types of users, so that the user can more easily configure a data protection manner required by the user. This further improves user experience.

Optionally, the vehicle owner mode may further include a first mode and a second mode. In other words, the user may set the first mode and the second mode based on a preference of the user. For example, in the first mode, the target vehicle forbids all applications to access the image data of the user, and in the second mode, the target vehicle allows some applications to access the image data of the user.

Certainly, in actual application, the vehicle owner mode may include more modes, and examples are not provided one by one herein. The guest mode may also include a plurality of modes.

It should be noted that a process in which the target vehicle determines the first configuration policy based on the first configuration file may be implemented in a plurality of manners, including but not limited to the following manners.

Implementation 1: The target vehicle automatically generates and determines the first configuration policy based on the first configuration file.

For example, if the target vehicle does not detect, within preset duration, that the current user performs any authorization operation, the target vehicle may obtain an authorization operation that is performed by the user on the user data associated with the first application when the user uses the first application last time, and automatically generate the first configuration policy with reference to the first configuration file.

In Implementation 1, generation of the configuration policy is effectively ensured, so that user data in the target vehicle can be protected in time, and user experience is effectively improved.

Implementation 2: The target vehicle determines the first configuration policy based on an authorization operation performed by the current user on the user data associated with the first application.

The authorization operation performed by the current user on the user data associated with the first application may be a corresponding instruction entered by the current user. The instruction may be a voice instruction of the current user, or may be a tap operation performed by the current user on the user interface. This is not specifically limited in embodiments of this application.

For example, the target vehicle displays a preset data protection type and/or a preset data protection manner (namely, the configuration information) on the user interface. The target vehicle receives, by using the user interface, a first instruction entered by the current user, and determines, in response to the first instruction, a first data protection type selected by the current user from the preset data protection type for the user data associated with the first application, and/or a first data protection manner selected from the preset data protection manner for the user data associated with the first application. Then, the target vehicle determines the first configuration policy based on the first data protection type and/or the first data protection manner.

In Implementation 2, the user participates in the process of determining the configuration policy, so that the target vehicle can determine the first configuration policy based on the authorization operation performed by the current user on the user data associated with the first application, and the user can perceive collection and processing of personal data. This effectively improves user experience.

It should be noted that, in Implementation 2, if the configuration information displayed on the user interface is different, the first configuration policy determined by the target vehicle based on the authorization operation performed by the current user on the user data associated with the first application is also different. The following provides descriptions with reference to specific examples.

Example 1

Figure 5A:
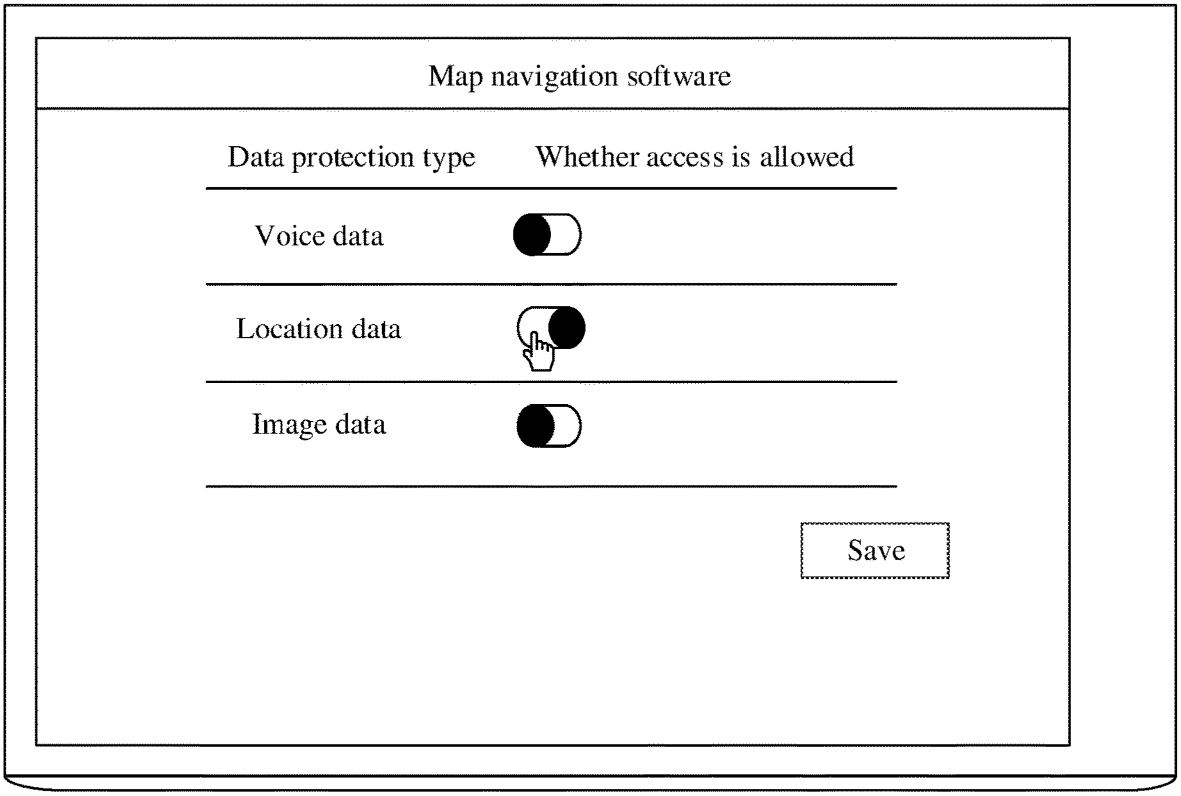
FIG. 5A is a schematic diagram 1 of an interface according to an embodiment of this application.

In FIG. 5A, for example, the first application is map navigation software. The configuration information displayed on the user interface includes the data protection type and the preset data protection manner, the data protection type includes the voice data, the location data, and the image data, and the preset data protection manner is access control. Therefore, the user may choose whether to allow the map navigation software to access the voice data, the location data, and the image data of the user.

As shown in FIG. 5A, after responding to the authorization operation of the current user, the target vehicle adjusts an access control on/off identifier corresponding to the location data to an on state, and keeps access control on/off identifiers corresponding to the image data and the voice data in an off state. In this case, the first configuration policy determined by the target vehicle is that the map navigation software is allowed to access the location data of the user, and the map navigation software is forbidden to access the voice data and the image data of the user.

Example 2

Figure 5B:
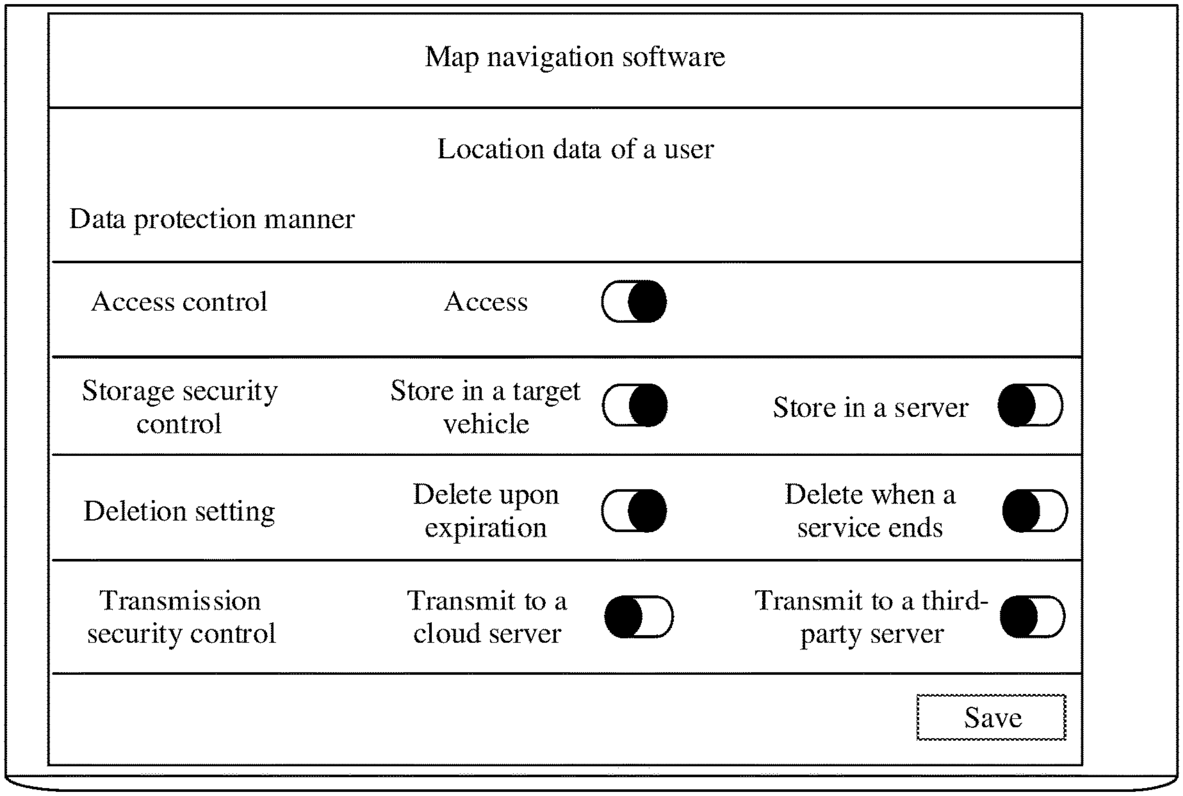
FIG. 5B is a schematic diagram 2 of an interface according to an embodiment of this application.

In FIG. 5B, for example, the first application is map navigation software, and the user data associated with the first application is the location data of the user. The configuration information displayed on the user interface includes a plurality of data protection manners for the location data of the user, and the data protection manners include access control, storage security control, deletion setting, and transmission security control. Therefore, the user may set one or more data protection manners for the location data of the user.

Still refer to FIG. 5B. In the access control manner, the user may choose whether to allow the map navigation software to access the location data of the user. In the storage security control manner, the user may choose whether to allow the location data of the user to be stored in the target vehicle or the server. In the deletion setting manner, the user may choose to delete the location data of the user upon expiration, or choose to delete the location data of the user after a service related to the map navigation software ends. In the transmission security control manner, the user may choose whether to transmit the location data of the user to a cloud server or the third-party server (namely, a server of a third-party service provider). Optionally, in the transmission security control manner, the user may further choose whether to allow the location data of the user to be transmitted to another vehicle (not shown in the figure).

In FIG. 5B, after responding to the authorization operation of the current user, the target vehicle adjusts an access control on/off identifier corresponding to the location data of the user to an enabled state, determines that the user chooses to store the location data in the target vehicle, determines that the user chooses to delete the location data of the user upon expiration, and forbids transmission of the location data of the user to the cloud server and the third-party server. In this case, the first configuration policy determined by the target vehicle is that the map navigation software is allowed to access the location data of the user, the location data of the user can be stored only in the target vehicle and cannot be transmitted to the cloud server or third-party server, and the location data of the user will be automatically deleted upon expiration. Optionally, in the deletion setting manner, the user may further set preset duration (not shown in the figure) for storing the location data.

Example 3

Figure 5C:
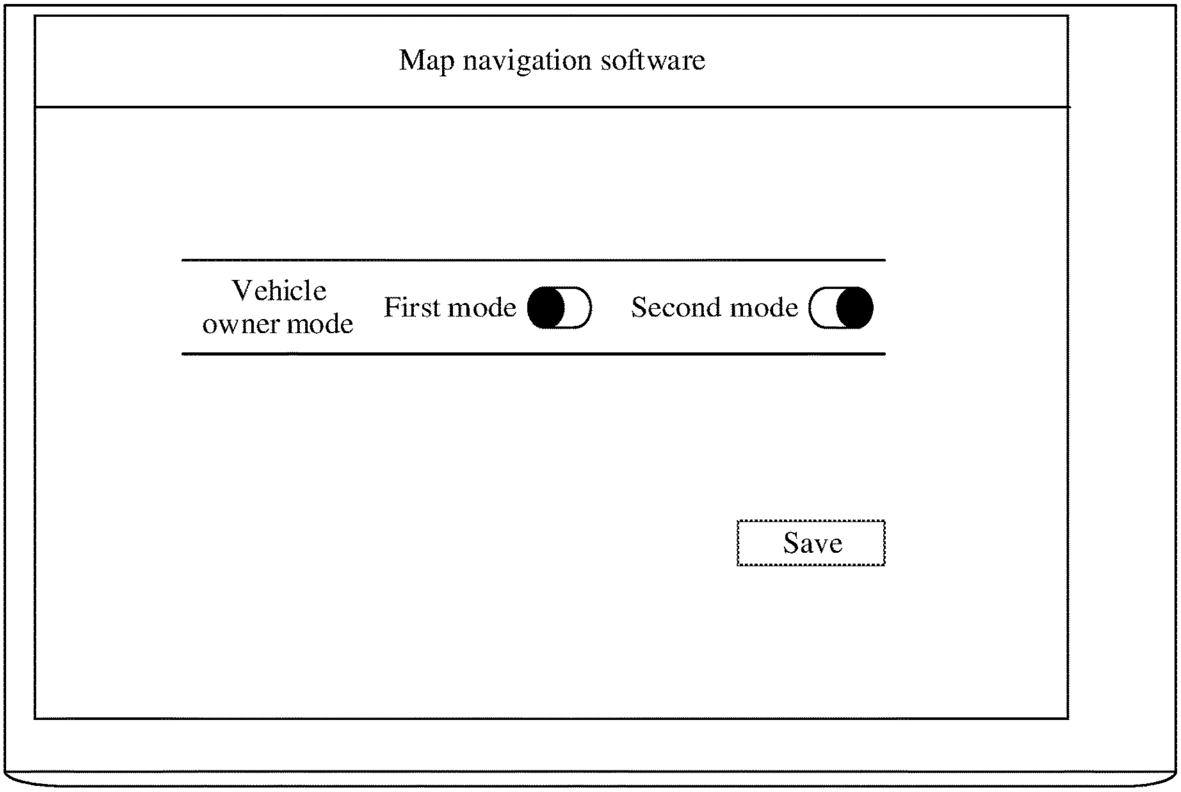
FIG. 5C is a schematic diagram 3 of an interface according to an embodiment of this application.

In FIG. 5C, for example, the first application is map navigation software. The configuration information displayed on the user interface includes only the data protection manner, and the current user is authenticated as the vehicle owner. In this case, the data protection manner is the vehicle owner mode, and the first mode and the second mode included in the vehicle owner mode are displayed on the user interface. The user only needs to select the first mode or the second mode, to complete authorization of the user data associated with the first application.

In FIG. 5C, after responding to the authorization operation of the current user, the target vehicle determines that the current user selects the second mode, and determines the first configuration policy based on information (for example, information such as access control, transmission security control, and storage security control) corresponding to the second mode. To be specific, the first configuration policy determined by the target vehicle is a preset data protection policy in the second mode.

To ensure that the user can update the authorization operation on the user data associated with the first application in real time, after detecting a trigger event, the target vehicle may further control the user interface to display the configuration information, so that the user can update the authorization operation on the user data associated with the first application in real time. The trigger event may include any one of detecting a user who uses the target vehicle for the first time, detecting an update of one or more pieces of application software associated with the target vehicle, detecting the user data associated with the first application, or detecting a change of a data protection policy associated with the first application.

S403: The target vehicle performs a first operation according to the first configuration policy.

In embodiments of this application, the first operation includes but is not limited to one or more of data access control, data storage security control, data deletion, and data transmission security control of the user data associated with the first application. The foregoing is merely an example, and there may be another first operation. Details are not described herein.

For example, when the first operation is data access control, the user data associated with the first application is the voice data and the image data, and that the target vehicle performs a first operation may be specifically: forbidding the first application to access the voice data and the image data of the current user, or allowing the first application to access the voice data and the image data of the current user.

For another example, when the first operation is data storage security control, the user data associated with the first application is the voice data and the image data, and that the target vehicle performs a first operation may be specifically: allowing storing the voice data and the image data of the user in the target vehicle, and forbidding storing the voice data and the image data of the user in the server.

For another example, when the first operation is data deletion control, the user data associated with the first application is the voice data and the image data, and that the target vehicle performs a first operation may be specifically: The target vehicle may automatically delete the voice data and the image data of the user when detecting that storage duration of the voice data and the image data of the user exceeds the preset duration.

For another example, when the first operation is data storage security transmission control, the user data associated with the first application is the voice data and the image data, and that the target vehicle performs a first operation may be specifically: forbidding sending the voice data and the image data of the user to the cloud server, the third-party server, or another vehicle.

It should be noted that the target vehicle may further perform diversified interaction with the user, so that the user can flexibly control the data of the user.

In a possible embodiment, the target vehicle may further receive a second instruction of the current user. The target vehicle may determine a second configuration file of the current user (namely, a preference configuration of the current user) in response to the second instruction. The target vehicle may determine a second configuration policy based on the second configuration file, and perform a second operation. The second operation may be data access control, data storage security control, data deletion, data transmission security control, or the like of user data associated with one or more applications in the target vehicle. This is not specifically limited in this application. For example, if the second instruction indicates that all applications are forbidden from accessing a Wi-Fi network in the target vehicle, the target vehicle determines that the preference configuration of the user is to forbid all the applications to access the Wi-Fi network, and the second operation performed by the target vehicle is to forbid all the applications to access the Wi-Fi network. In this way, the configuration policy better meets a requirement of the current user for protecting the data of the user. This effectively improves user experience.

In a possible embodiment, the target vehicle may further receive a third instruction of the current user, and determine, in response to the third instruction, that the current user needs to delete the user data associated with the first application, so that the target vehicle automatically deletes the user data associated with the first application. For example, the user may enter an instruction to delete location data of the user within one month. In this way, the user can flexibly delete data that the user wants to delete. This effectively meets a requirement of the user for managing the personal data.

It should be understood that the user data associated with the first application that is deleted herein may be all user data associated with the first application, or may be user data of a specific type (for example, one or more of voice data, location data, and image data) associated with the first application. This is not specifically limited in embodiments of this application.

In a possible embodiment, when detecting that storage duration of the user data associated with the first application exceeds the preset duration, the target vehicle automatically deletes the user data associated with the first application. In this implementation, when detecting that storage duration of the user data associated with the first application exceeds the preset duration, the target vehicle may automatically delete the data. In this way, the personal data of the user is effectively protected, and a case in which the personal data of the user is illegally retained by the third-party service provider is avoided.

It should be understood that before deleting the data of the user, the target vehicle further needs to detect a running status of the entire vehicle, and performs a deletion operation only when determining that the target vehicle is in a non-driving state.

In a possible embodiment, the target vehicle further obtains an operation record of the current user, and generates a configuration log of the current user, where the configuration log is used to update the first configuration file. For example, when the configuration information in the first configuration file includes the vehicle owner mode and the guest mode, the target vehicle may adjust, based on the configuration log, information (for example, information such as access control, transmission security control, and storage security control) corresponding to the vehicle owner mode and the guest mode. In this way, the first configuration file is effectively optimized, so that the configuration policy determined based on the first configuration file better meets a data protection requirement of the user.

In a possible embodiment, the target vehicle may further determine first user data that is being used in a plurality of pieces of user data associated with the first application, and display the first user data on the user interface. For example, the first application is the map navigation software. When detecting that the map navigation software is using the location data of the user, the target vehicle displays, on the user interface, an icon corresponding to the map navigation software. In this way, a usage status of the personal data of the user is visualized. This effectively improves user experience.

In the embodiment shown in FIG. 4, the target vehicle may determine the first configuration policy based on the received configuration file, so that the target vehicle may configure, according to the first configuration policy, the protection manner of the user data associated with the first application, and perform the corresponding operation. In this way, a data protection capability of the vehicle can be effectively improved, and the user data associated with the first application is protected. This effectively improves user experience.

Embodiment 2

Figure 6:
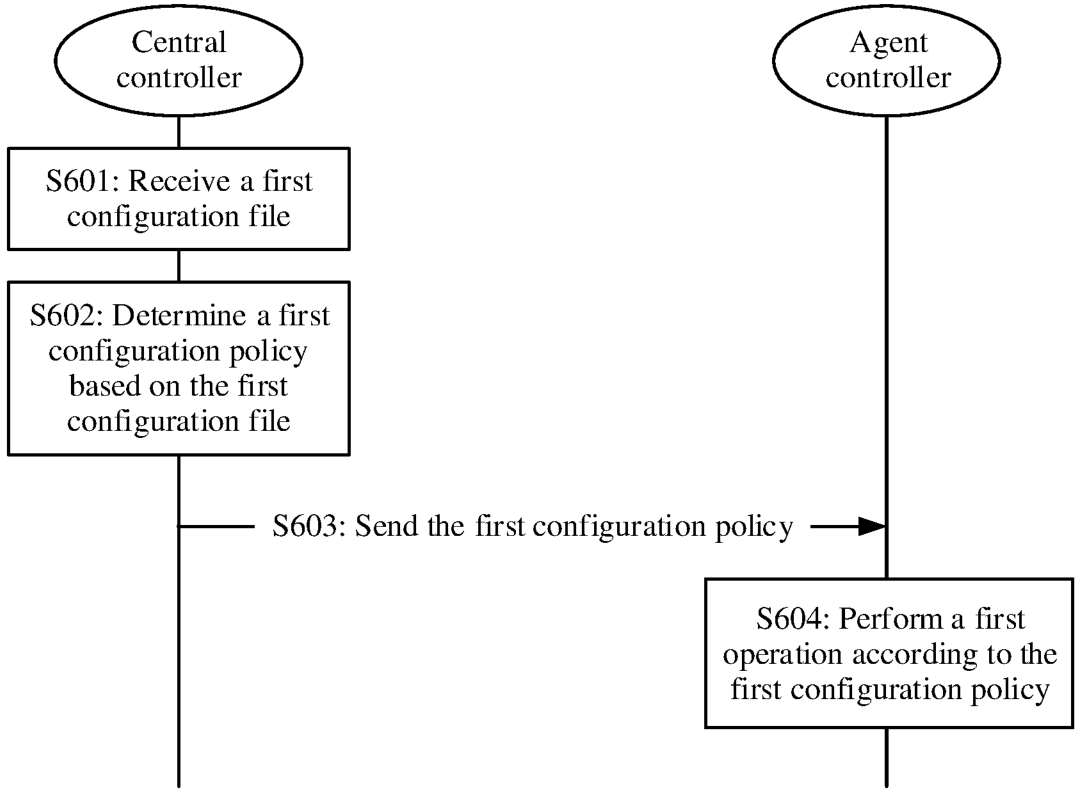
FIG. 6 is a schematic flowchart of another data protection method according to an embodiment of this application.

FIG. 6 is a schematic flowchart of another data protection method according to an embodiment of this application. The method may be applied to the application scenario shown in FIG. 2. The method includes the following steps.

S601: A central controller receives a first configuration file.

In this embodiment of this application, the central controller may receive the first configuration file from a server, or may receive the first configuration file from a third-party server. This is not specifically limited in embodiments of this application.

S602: The central controller determines a first configuration policy based on the first configuration file.

In this embodiment of this application, the first configuration policy is used to configure a protection manner of user data associated with a first application.

The first application may be one or more applications installed in the target vehicle. For example, the first application may be a map navigation application, a vehicle-mounted central control entertainment application, a vehicle-mounted communication module system application, or the like. A specific type of the first application is not limited in embodiments of this application.

The user data associated with the first application may be one or more types of user data, for example, may be location data associated with the first application, for another example, may be location data and voice data that are associated with the first application, for still another example, may be location data, voice data, and that are image data associated with the first application. This is not specifically limited in embodiments of this application.

In this embodiment of this application, the first configuration file may include configuration information, and the configuration information may include a data protection type and/or a data protection manner. The data protection type may be understood as a type of data that needs to be protected in the user data associated with the first application, for example, voice data, location data, and image data of a user. This is not specifically limited herein. The data protection manner may be understood as access control, storage security control, deletion setting, transmission security control, and the like of data of one or more data types in the user data associated with the first application.

To ensure that a user who performs an authorization operation on the user data associated with the first application is an authorized user, in a possible implementation, before the central controller determines the first configuration policy, the central controller may obtain a first account associated with a current user, and perform authentication on the first account. When determining that authentication on the first account succeeds, the central controller controls a user interface to display the configuration information, or when authentication on the first account fails, the target vehicle does not display the configuration information. In this way, the central controller performs authentication on the first account of the current user, so that it is ensured that the user who performs the authorization operation on the user data associated with the first application is an authorized user, and authorization operations performed by different authorized users on the user data associated with the first application can be distinguished. This effectively avoids an unauthorized management operation performed by an unauthorized user on an application in the target vehicle, and effectively improves security of the user data.

It should be understood that the first account associated with the current user may be a mobile phone number of the user, a driving license number of the user, a facial identifier of the user, or the like. This is not specifically limited in embodiments of this application. The user interface in embodiments of this application may be implemented by the human-computer interaction system 103 in FIG. 1.

It should be noted that a process in which the central controller determines the first configuration policy based on the first configuration file in S602 is similar to a process in which the target vehicle determines the first configuration policy based on the first configuration file in S402. Refer to the foregoing descriptions. Only the "target vehicle" needs to be replaced with the "central controller". Details are not described herein again.

S603: The central controller sends the first configuration policy to an agent controller, and the agent controller receives the first configuration policy.

For example, the central controller is a CDC, and the agent controller is a TBOX. The CDC determines, based on a configuration file received from the server, a configuration policy corresponding to user data associated with an intelligent cockpit application, and sends the policy to the agent controller. The central controller and the agent controller may also have different definitions. This is not limited in embodiments of this application.

S604: The agent controller performs a first operation according to the first configuration policy.

In embodiments of this application, the first operation includes but is not limited to one or more of data access control, data storage security control, data deletion control, and data transmission security control of the user data associated with the first application. The foregoing is merely an example, and there may be another first operation. Details are not described herein. It should be understood that the agent controller is associated with the first application, so that the agent controller may perform the first operation according to the first configuration policy. For example, if the first application is the intelligent cockpit application, the agent controller associated with the first application is an MDC.

For example, when the first operation is data access control, the user data associated with the first application is voice data and image data, and that the agent controller performs a first operation may be specifically: forbidding the first application to access the voice data and the image data of the current user, or allowing the first application to access the voice data and the image data of the current user.

For another example, when the first operation is data storage security control, the user data associated with the first application is voice data and image data, and that the agent controller performs a first operation may be specifically: allowing storing the voice data and the image data of the user in the agent controller, and forbidding storing the voice data and the image data of the user in the server.

For another example, when the first operation is data deletion control, the user data associated with the first application is voice data and image data, and that the agent controller performs a first operation may be specifically: The agent controller may automatically delete the voice data and the image data of the user when detecting that storage duration of the voice data and the image data of the user exceeds the preset duration.

For another example, when the first operation is data storage security transmission control, the user data associated with the first application is voice data and image data, and that the agent controller performs a first operation may be specifically: forbidding sending the voice data and the image data of the user to the cloud server, the third-party server, or another vehicle.

In a possible implementation, the central controller may receive a second instruction of the current user, and determine a second configuration file of the current user (namely, a preference configuration of the current user) according to the second instruction. The central controller determines a second configuration policy based on the second configuration file, and sends the second configuration policy to the agent controller. The agent controller performs a second operation based on the second configuration policy. The second operation may be data access control, data storage security control, data deletion, data transmission security control, or the like performed by the agent controller on user data associated with one or more applications. This is not specifically limited in this application. For example, if the user enters the second instruction to indicate to forbid all applications to access the image data of the user in the target vehicle, the central controller determines that the second configuration policy is to forbid all the applications to access the image data of the user in the target vehicle, and sending the second configuration policy to the agent controller. The agent controller sets, based on the second configuration policy, all the applications to be forbidden to access the image data of the user. In this way, the configuration policy better meets a requirement of the current user for protecting the data of the user. This effectively improves user experience.

In a possible implementation, the central controller may further receive a third instruction of the current user, and send the third instruction to the agent controller. If the third instruction indicates to delete the user data associated with the first application, the agent controller deletes, in response to the third instruction, the user data associated with the first application. In this way, a requirement of the user for managing the personal data is effectively met. It should be understood that the user data associated with the first application that is deleted herein may be all user data associated with the first application, or may be user data of a specific type (for example, one or more of voice data, location data, and image data) associated with the first application. This is not specifically limited in embodiments of this application.

In a possible implementation, when detecting that storage duration of the user data associated with the first application exceeds preset duration, the central controller generates a fourth instruction, and sends the fourth instruction to the agent controller. The agent controller deletes, according to the fourth instruction, the user data associated with the first application. In this way, a case in which the user data associated with the first application is illegally retained by a third-party service provider corresponding to the first application is effectively avoided. This further enhances a data protection capability of the target vehicle.

It should be understood that both the third instruction and the fourth instruction are instructions for deleting the user data. To ensure that a data deletion operation does not affect normal running of the target vehicle, before sending the third instruction or the fourth instruction to the agent controller, the central controller further needs to detect a running status of the entire vehicle, and sends the third instruction or the fourth instruction to the agent controller only when determining that the target vehicle is in a non-driving state.

In a possible implementation, the central controller further obtains an operation record of the current user, generates a configuration log of the current user, and sends the configuration log manner to the server, so that the server updates the first configuration file based on the configuration log. In this way, the first configuration file is effectively optimized, so that the first configuration file better meets a requirement of the user for protecting the user data associated with the first application.

In a possible embodiment, the central controller may further determine first user data that is being used in a plurality of pieces of user data associated with the first application, and display the first user data on the user interface. For example, the first application is the map navigation software. When detecting that the map navigation software is using the location data of the user, the central controller displays, on the user interface, an icon corresponding to the map navigation software. In this way, a usage status of the personal data of the user is visualized. This effectively improves user experience.

In the embodiment shown in FIG. 6, the central controller may determine the first configuration policy based on the received configuration file, and the central controller may send the first configuration policy to the agent controller, so that the agent controller configures the protection manner of the user data associated with the first application, and performs the corresponding protection operation. In this way, the central controller and the agent controller collaborate to protect the user data, so that the data protection capability of the vehicle can be effectively improved. This effectively improves user experience.

Figure 7:
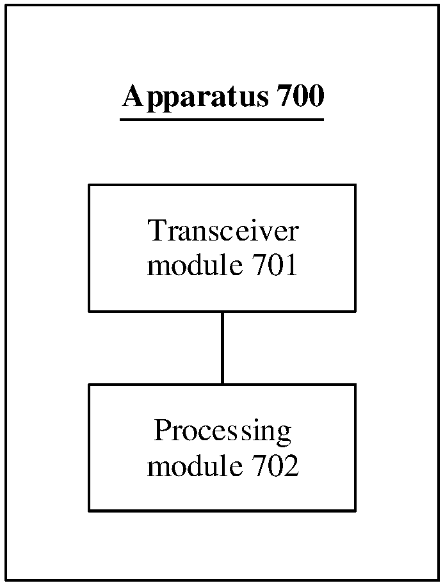
FIG. 7 is a schematic diagram of a structure of a data protection apparatus according to an embodiment of this application.

FIG. 7 is a schematic diagram of a possible structure of a data protection apparatus in the foregoing embodiments of this application. The apparatus 700 may be configured to implement the data protection method in any one of the embodiments shown in FIG. 4 or FIG. 6.

For example, the apparatus 700 may include:

- a transceiver module 701, configured to receive a first configuration file; and
- a processing module 702, configured to: determine a first configuration policy based on the first configuration file, and perform a first operation according to the first configuration policy, where the first configuration policy is used to configure a protection manner of user data associated with a first application.

When the processing module 702 is divided into a plurality of processing submodules, the apparatus 700 may be configured to implement the data protection method in the embodiment shown in FIG. 6, and the processing submodule may be the foregoing central controller or agent controller.

It should be understood that for another optional implementation of the apparatus 700, refer to related content in the embodiment shown in FIG. 4 or FIG. 6. Details are not described herein again.

Figure 8:
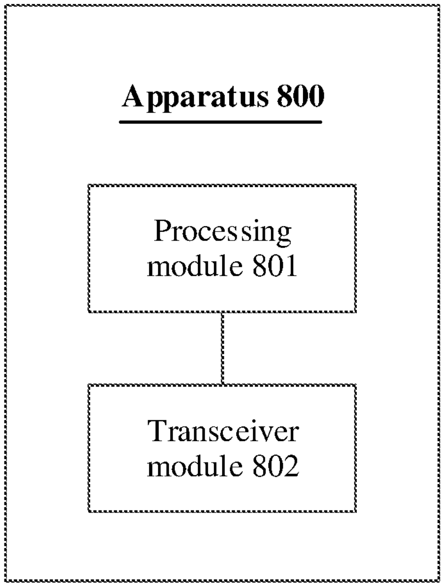
FIG. 8 is a schematic diagram of a structure of another data protection apparatus according to an embodiment of this application.

FIG. 8 is a schematic diagram of a possible structure of a data protection apparatus in the foregoing embodiments of this application. The apparatus 800 may be configured to implement functions of the server shown in FIG. 1 or FIG. 2.

For example, the apparatus 800 may include:

- a processing module 801, configured to determine a first configuration file; and
- a transceiver module 802, configured to send the first configuration file to a target vehicle, where the first configuration file is used by the target vehicle to determine a first configuration policy, and the first configuration policy is used to configure a protection manner of user data associated with a first application.

Based on a same technical concept, an embodiment of this application further provides a vehicle. The vehicle may include a processor, and the processor is configured to perform the data protection method in the embodiment shown in FIG. 4 or FIG. 6.

In a possible design, the vehicle further includes a memory, configured to store a computer program or instructions.

In a possible design, the vehicle further includes a transceiver, configured to receive or send information.

Based on a same technical concept, an embodiment of this application further provides a server. The server includes a processor, and the processor is configured to perform functions of the server shown in FIG. 1 or FIG. 2, to implement the method provided in embodiments of this application.

In a possible design, the server further includes a memory, configured to store a computer program or instructions.

In a possible design, the server further includes a transceiver, configured to receive or send information.

In a possible design, the server is a single server or a server cluster including a plurality of subservers. When the server is a server cluster including a plurality of subservers, the plurality of subservers jointly perform the functions of the server shown in FIG. 1 or FIG. 2.

An embodiment of this application further provides a chip system. The chip system includes at least one processor. When program instructions are executed in the at least one processor, the data protection method in the embodiment shown in FIG. 4 or FIG. 6 is implemented.

In a possible design, the chip system further includes a communication interface, and the communication interface is configured to input or output information.

In a possible design, the chip system further includes a memory. The memory is coupled to the processor by using the communication interface, and is configured to store the foregoing instructions, so that the processor reads, by using the communication interface, the instructions stored in the memory.

For example, the processor may be a central processing unit (Central Processing Unit, CPU), or may be another general-purpose processor, a digital signal processor (Digital Signal Processor, DSP), an application-specific integrated circuit (Application-Specific Integrated Circuit, ASIC), a field programmable gate array (Field Programmable Gate Array, FPGA), another programmable logic device, a discrete gate, a transistor logic device, a discrete hardware component, or the like. The general-purpose processor may be a microprocessor, or the processor may be any conventional processor or the like.

It may be understood that the memory mentioned in embodiments of this application may be a volatile memory or a nonvolatile memory, or may include both a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. By way of example, and not limitation, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM).

It should be noted that when the processor is a general-purpose processor, a DSP, an ASIC, an FPGA or another programmable logic device, a discrete gate or transistor logic device, or a discrete hardware component, the memory (storage module) may be integrated into the processor.

It should be noted that the memory described in this specification aims to include but is not limited to these memories and any memory of another proper type.

An embodiment of this application further provides a computer program product including instructions. When the computer program product runs on the foregoing apparatus, the data protection method in the embodiment shown in FIG. 4 or FIG. 6 is performed.

An embodiment of this application provides a computer-readable storage medium. The computer-readable storage medium stores a computer program. When the computer program is run, the data protection method in the embodiment shown in FIG. 4 or FIG. 6 is implemented.

The foregoing embodiments may be combined with each other to achieve different technical effects.

The foregoing descriptions about implementations allow a person skilled in the art to clearly understand that, for the purpose of convenient and brief description, division of the foregoing functional modules is used as an example for illustration. In actual application, the foregoing functions can be allocated to different functional modules for implementation based on a requirement. To be specific, an inner structure of an apparatus is divided into different functional modules to implement all or some of the functions described above.

In the several embodiments provided in this application, it should be understood that the disclosed apparatuses and methods may be implemented in other manners. For example, the described apparatus embodiments are merely examples. For example, division of the modules or units is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software function unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of steps of methods in embodiments of this application. The foregoing storage medium includes any medium that can store program code, like a USB flash drive, a removable hard disk, a ROM, a RAM, a magnetic disk, or an optical disc. The foregoing descriptions are merely specific implementations of embodiments of this application, but are not intended to limit the protection scope of embodiments of this application. Any variation or replacement within the technical scope disclosed in this application shall fall within the protection scope of embodiments of this application. Therefore, the protection scope of embodiments of this application shall be subject to the protection scope of the claims.

What is claimed is:

1. A method, applied to a target vehicle, wherein the method comprises:

receiving a first configuration file;

determining, based on the first configuration file, a first configuration policy for configuring a protection manner of user data associated with a first application;

performing a first operation based on the first configuration policy, wherein the first operation comprises one or more of data access control, data storage security control, data deletion, or data transmission security control;

obtaining an operation record associated with the first operation, wherein the operation record comprises information indicating execution results of the first operation; and generating a configuration log based on the operation record associated with the first operation, wherein the configuration log is configured to update the first configuration file, and wherein updating the first configuration file based on the configuration log comprises modifying the first configuration policy to optimize protection of the user data based on the execution results of the first operation, wherein the first configuration file comprises a vehicle owner mode and a guest mode, and wherein modifying the first configuration policy comprises adjusting access control information corresponding to the vehicle owner mode and the guest mode based on the configuration log.

2. The method according to claim 1, further comprising:
determining a storage duration of the user data associated with the first application; and
deleting the user data associated with the first application in response to the storage duration exceeding a preset duration.

3. The method according to claim 2, wherein deleting the user data associated with the first application comprises:
determining a running status of the target vehicle; and
deleting the user data associated with the first application when the target vehicle is in a non-running status.

4. The method according to claim 1, wherein the first configuration file comprises configuration information; and wherein the method further comprises:
obtaining a first account associated with a current user;
performing authentication on the first account;
determining that authentication on the first account succeeds; and
controlling a user interface to display the configuration information.

5. The method according to claim 4, wherein the configuration information comprises at least one of a data protection type or a data protection manner; and the determining a first configuration policy based on the first configuration file comprises:
receiving a first instruction entered by the current user, wherein the first instruction indicates at least one of a first data protection type selected by the current user from the data protection type for the user data associated with the first application or a first data protection manner selected by the current user from the data protection manner for the user data associated with the first application; and
determining the first configuration policy based on the at least one of the first data protection type or the first data protection manner.

6. The method according to claim 4, wherein the controlling a user interface to display the configuration information comprises:
after detecting a trigger event, controlling the user interface to display the configuration information, wherein
the trigger event comprises one or more of: detecting a user who uses the target vehicle for the first time, detecting an update of one or more pieces of application software associated with the target vehicle, detecting the user data associated with the first application, or detecting a change of a data protection policy associated with the first application.

7. The method according to claim 4, wherein the target vehicle comprises a central controller and an agent controller, and the agent controller is associated with the first application; and the method further comprises:
receiving, by the central controller, a second instruction of the current user, wherein the second instruction indicates to determine a second configuration file of the current user, and the second configuration file is a preference configuration of the current user;
determining, by the central controller, a second configuration policy based on the second configuration file, and sending the second configuration policy to the agent controller; and
performing, by the agent controller, a second operation based on the second configuration policy.

8. The method according to claim 7, wherein the method further comprises:
receiving, by the central controller, a third instruction of the current user, wherein the third instruction indicates to delete the user data associated with the first application;
sending, by the central controller, the third instruction to the agent controller; and
in response to the third instruction, deleting, by the agent controller, the user data associated with the first application.

9. The method according to claim 7, wherein the method further comprises:
in response to detecting that storage duration of the user data associated with the first application exceeds preset duration, generating, by the central controller, a fourth instruction, and sending the fourth instruction to the agent controller; and
deleting, by the agent controller according to the fourth instruction, the user data associated with the first application.

10. An apparatus, comprising:
at least one processor; and
one or more memories coupled to the at least one processor and storing programming instructions for execution by the at least one processor to cause the apparatus to:
receive a first configuration file;
determine, based on the first configuration file, a first configuration policy for configuring a protection manner of user data associated with a first application;
perform a first operation according to the first configuration policy, wherein the first operation comprises one or more of data access control, data storage security control, data deletion, or data transmission security control;
obtain an operation record associated with the first operation, wherein the operation record comprises information indicating execution results of the first operation; and
generate a configuration log based on the operation record associated with the first operation, wherein the configuration log is configured to update the first configuration file, and wherein updating the first configuration file based on the configuration log comprises modifying the first configuration policy to optimize protection of the user data based on the execution results of the first operation, wherein the first configuration file comprises a vehicle owner mode and a guest mode, and wherein modifying the first configuration policy comprises adjusting access control information corresponding to the vehicle owner mode and the guest mode based on the configuration log.

11. The apparatus according to claim 10, wherein the programming instructions are for execution by the at least one processor to cause the apparatus to:
determine a storage duration of the user data associated with the first application; and
delete the user data associated with the first application in response to the storage duration exceeding a preset duration.

12. The apparatus according to claim 10, wherein the first configuration file comprises configuration information; and the programming instructions are for execution by the at least one processor to cause the apparatus to:
obtain a first account associated with a current user;
perform authentication on the first account;

determine that authentication on the first account succeeds; and control a user interface to display the configuration information.

13. The apparatus according to claim 12, wherein the configuration information comprises at least one of a data protection type or a data protection manner; and the programming instructions are for execution by the at least one processor to cause the apparatus to:

receive a first instruction entered by the current user, wherein the first instruction indicates at least one of a first data protection type selected by the current user from the data protection type for the user data associated with the first application or a first data protection manner selected by the current user from the data protection manner for the user data associated with the first application; and determine the first configuration policy based on the at least one of the first data protection type or the first data protection manner.

14. The apparatus according to claim 12, wherein the programming instructions are for execution by the at least one processor to cause the apparatus to:

after detecting a trigger event, control the user interface to display the configuration information, wherein the trigger event comprises one or more of detecting a user who uses the apparatus for the first time, detecting an update of one or more pieces of application software associated with the apparatus, detecting the user data associated with the first application, or detecting a change of a data protection policy associated with the first application.

15. The apparatus according to claim 12, wherein the apparatus comprises a central controller and an agent controller, and the agent controller is associated with the first application; and the programming instructions are for execution by the at least one processor to cause the apparatus to:

receive, by the central controller, a second instruction of the current user, wherein the second instruction indicates to determine a second configuration file of the current user, and the second configuration file is a preference configuration of the current user;

determine, by the central controller, a second configuration policy based on the second configuration file, and sending the second configuration policy to the agent controller, and perform, by the agent controller, a second operation based on the second configuration policy.

16. The apparatus according to claim 15, wherein the programming instructions are for execution by the at least one processor to cause the apparatus to;

receive, by the central controller, a third instruction of the current user, wherein the third instruction indicates to delete the user data associated with the first application;

send, by the central controller, the third instruction to the agent controller; and in response to the third instruction, delete, by the agent controller, the user data associated with the first application.

17. The apparatus according to claim 15, wherein the programming instructions are for execution by the at least one processor to cause the apparatus to:

in response to detecting that storage duration of the user data associated with the first application exceeds preset duration, generate, by the central controller, a fourth instruction, and send the fourth instruction to the agent controller; and delete, by the agent controller according to the fourth instruction, the user data associated with the first application.

18. An apparatus, comprising:

at least one processor; and one or more memories coupled to the at least one processor and storing programming instructions for execution by the at least one processor to cause the apparatus to:

determine a first configuration file for a target vehicle to determine a first configuration policy to configure a protection manner of user data associated with a first application;

send the first configuration file to the target vehicle;

receive a configuration log associated with a first operation, wherein the first operation is performed based on the first configuration policy and comprises one or more of data access control, data storage security control, data deletion, or data transmission security control, wherein the configuration log is generated based on an operation record comprising information indicating execution results of the first operation;

update the first configuration file based on the configuration log by modifying the first configuration policy to optimize protection of the user data based on execution results of the first operation; and send an updated first configuration file to the target vehicle, the updated first configuration file being configured to update the first configuration policy, wherein the first configuration file comprises a vehicle owner mode and a guest mode, and wherein modifying the first configuration policy comprises adjusting access control information corresponding to the vehicle owner mode and the guest mode based on the configuration log.

19. The apparatus according to claim 18, wherein the first configuration file is associated with a user of the target vehicle.

20. The apparatus according to claim 19, wherein the first configuration file comprises configuration information that includes at least one of a data protection type or a data protection manner.

* * * * *